(12) United States Patent
Kuiper

(10) Patent No.: US 11,385,456 B2
(45) Date of Patent: Jul. 12, 2022

(54) DEVICE AND METHOD FOR POSITIONING A MOVEABLE MEMBER, AND A STEERABLE MIRROR UNIT INCLUDING SUCH DEVICE

(71) Applicant: Nederlandse Organisatie voor toegepast-natuurwetenschappelijk onderzoek TNO, The Hague (NL)

(72) Inventor: Stefan Kuiper, The Hague (NL)

(73) Assignee: Nederlandse Organisatie voor toegepast-natuurwetenschappelijk onderzoek TNO, s-Gravenhage (NL)

( * ) Notice: Subject to any disclaimer, the term of this patent is extended or adjusted under 35 U.S.C. 154(b) by 167 days.

(21) Appl. No.: 16/648,718

(22) PCT Filed: Sep. 20, 2018

(86) PCT No.: PCT/NL2018/050619
§ 371 (c)(1),
(2) Date: Mar. 19, 2020

(87) PCT Pub. No.: WO2019/059764
PCT Pub. Date: Mar. 28, 2019

(65) Prior Publication Data
US 2020/0218059 A1    Jul. 9, 2020

(30) Foreign Application Priority Data

Sep. 20, 2017 (EP) ..................................... 17192093

(51) Int. Cl.
*G02B 26/08* (2006.01)
*G02B 26/10* (2006.01)

(52) U.S. Cl.
CPC ......... *G02B 26/085* (2013.01); *G02B 26/101* (2013.01)

(58) Field of Classification Search
CPC ........................... G02B 26/085; G02B 26/101
(Continued)

(56) References Cited

U.S. PATENT DOCUMENTS

| 8,699,112 B2* | 4/2014 | Mizoguchi ........... G02B 26/105 359/224.1 |
| 2005/0018322 A1 | 1/2005 | Ben-Gad et al. |
| 2016/0178894 A1* | 6/2016 | Rose .................... G02B 26/085 359/199.3 |

FOREIGN PATENT DOCUMENTS

| EP | 2455795 A1 | 5/2012 |
| JP | 2002250891 A | 9/2002 |
| WO | WO 9503562 A1 | 2/1995 |

OTHER PUBLICATIONS

Ernst Csencsics et al., "Bandwidth Extension of Hybrid-Reluctance-Force-based Tip/Tilt System by Reduction of Eddy Currents," 2017 IEEE International Conference on Advanced Intelligent Mechatronics (AIM) Sheraton Arabella Park Hotel, Munich, Germany, pp. 1167-1172 (Jul. 3-7, 2017).

(Continued)

*Primary Examiner* — Euncha P Cherry
(74) *Attorney, Agent, or Firm* — Leydig, Voit & Mayer, Ltd.

(57) ABSTRACT

A device and method for pivotally positioning a moveable member, wherein a magnetically conductive base member is arranged opposite the magnetically conductive moveable member with a gap provided therebetween. A first magnet is arranged for providing a first magnetic flux through the base member and the moveable member such as to provide at least two first magnetic closed flux paths. A second electromagnet is arranged for providing a second magnetic flux through the base member and the moveable member such as to provide at least one second magnetic closed flux path. The second electromagnet is configured for changing, in one or (Continued)

more of the at least two first magnetic closed flux paths, a resulting magnetic flux provided by the first magnetic flux and the second magnetic flux such as to pivot the moveable member by means of the pivot member. The moveable member is pivotally suspended using a flexural pivot member.

15 Claims, 7 Drawing Sheets

(58) Field of Classification Search
USPC .................................................. 359/199.3
See application file for complete search history.

(56) References Cited

OTHER PUBLICATIONS

Yongjun Long et al., "Modeling and design of a normal stress electromagnetic actuator with linear characteristics for fast steering mirror," SPIE Optical Engineering, vol. 53(5), pp. 054102-1 to 054102-12 (May 2014).

Daniel J. Kluk et al., "A High-Bandwidth, High-Precision, Two-Axis Steering Mirror with Moving Iron Actuator," Mechatronics 22(2012), pp. 257-270 (2012).

\* cited by examiner

DEVICE AND METHOD FOR POSITIONING A MOVEABLE MEMBER, AND A STEERABLE MIRROR UNIT INCLUDING SUCH DEVICE

CROSS-REFERENCE TO RELATED APPLICATIONS

This patent application is a U.S. National Phase of PCT International Application No. PCT/NL2018/050619, filed Sep. 20, 2018, which claims priority to European Application No. 17192093.7, filed Sep. 20, 2017, which are both expressly incorporated by reference in their entireties, including any references contained therein.

FIELD OF THE INVENTION

The invention relates to a device and method for positioning a moveable member. The invention further relates to a steerable mirror unit including an actuating device for positioning a mirror.

BACKGROUND TO THE INVENTION

An accurate positioning of an object or article may be required in some applications. For instance, a precise actuating mechanism may be necessary for orientating a mirror in a steering mirror unit. A fine/fast steering mirror (FSM) may be used for beam steering, laser communication, etc. Typically a piezoelectric or electromagnetic actuation is employed.

It is generally known that laser communication can enable high data communications between satellites, aerial vehicles, and ground stations. However, pointing of an optical beam between a transmitter and a receiver needs to be performed with a relatively high precision, e.g. an precision down to a few microrads or better, for achieving successful laser communication over large distances such as for example several thousands of kilometers or more. Within a laser communication terminal, pointing can be controlled over a tracking sensor being arranged for measuring an incoming angle of the light from a partnering terminal. On the basis of sensor readings of the tracking sensor, misalignments can then be corrected, for example in closed loop, by means of the fine steering mirror. Misalignments may for example originate from disturbances on the satellite platform stemming from various active elements, such as reaction wheels and motorizations of solar panels. Furthermore, within the laser communications terminal a point ahead assembly can be utilized for generating an offset angle between the transmitted and receiving signals to compensate for the running time of the laser light towards the receiving end.

There is a need for an actuator enabling precise positioning of an object or article. Various actuator designs can be utilized for applications requiring precise positioning, such as for example piezoelectric actuators, electromagnetic actuators, Lorentz actuators (e.g. controlled over either eddy-current sensors or capacitive sensors), magnetostrictive actuators, (variable) reluctance actuators, etc. Such actuator designs may also be suitable for use in a steering mirror.

Variable reluctance actuators may have the advantage of higher efficiency in terms of force to volume and force per unit energy. However, the control of electromagnetically driven actuators may be more challenging, for example as a result of inherent (dynamic) non-linearities and/or frequency dependent characteristics. For example, the actuating force can be proportional to the current squared and inversely proportional to the air gap squared and further depend on the frequency, e.g. actuating force may decrease at higher frequencies since it is more difficult for the magnetic field to penetrate magnetic material at such frequencies. This may require complex compensation and control systems.

There is a desire to obtain a compact, high bandwidth, high-throughput, high-acceleration and/or energy efficient actuator suitable for accurately positioning or orientating an object or article such as for example a mirror. Often, however, this may lead to a higher structural complexity of the actuator design and/or higher costs.

SUMMARY OF THE INVENTION

It is an object of the invention to provide for a device and a method that obviates at least one of the above-mentioned drawbacks.

Additionally or alternatively, it is an object of the invention to provide for an actuating device and method for enabling precise positioning.

Additionally or alternatively, it is an object of the invention to provide for an actuating device and method for orientating a moveable object/article with increased accuracy and/or controllability.

Thereto, in accordance with a first aspect, the invention provides for an actuating device arranged for positioning a moveable member. The actuating device comprises a magnetically conductive base member arranged opposite the moveable member with a gap provided therebetween. The moveable member is pivotally arranged with respect to the base member. The moveable member and the base member are magnetically conductive such as to allow one or more magnetic closed flux paths. The actuating device further comprises at least one first magnet configured for providing a first magnetic flux through the base member and the moveable member such as to provide at least two first magnetic closed flux paths. Additionally, the actuating device comprises at least one second magnet configured for providing a second magnetic flux through the base member and the moveable member such as to provide at least one second magnetic closed flux path. The at least one second magnet is an electromagnet. The at least one second magnet is configured for receiving a controllable second magnet actuation signal for controlling the second magnetic flux for changing, in one or more of the at least two first magnetic closed flux paths, a resulting magnetic flux provided by the first magnetic flux and the second magnetic flux for pivoting the moveable member. The moveable member is pivotally suspended opposite the base member by means of a flexural pivot member which is arranged to provide one or more unconstrained degrees of freedom for the moveable member and one or more constrained degrees of freedom for the moveable member. The one or more unconstrained degrees of freedom include at least one rotational degree of freedom, and the one or more constrained degrees of freedom include at least a translational degree of freedom in a longitudinal direction of the flexural pivot member.

By means of controlling the second magnetic flux, a torque may be exerted directly on the moveable member so as to pivot the moveable member by bending/flexing a portion of the flexural pivot member. The flexural pivot member provides for a compliant mechanism for enabling adjustment or variation of the relative position of the moveable member with respect to at least the base member of the actuating device. The flexural pivot member allows a smooth and continuous displacement, with no irreversible deformation. In this way, a predictable and repeatable motion can be obtained at high resolution. Additionally, a linear relationship between the applied force and displacement may be possible for small distortions.

The flexural pivot member can enable a degree of flexure so as to provide a mechanism for rotating or pivoting the moveable member. In an advantageous way, this motion can be accomplished without hysteresis or any frictional problems (cf. surface force behavior) that may be associated with other types of drive systems. As a result, the actuating device provides for an improved repeatability while enabling precision positioning of the moveable member. Furthermore, the flexural pivot member can be free of lubricants.

The flexural pivot member can be a flexible element configured to be compliant in specific degrees of freedom for holding the moveable member and allowing pivotal movement of the moveable member with respect to the base member. The flexural pivot member may bend or flex for providing angular compliance.

The flexural pivot member can be configured to allow the moveable member to pivot in at least one direction, for example, along a first rotational axis. Hence, the flexural pivot member provides at least one degree of freedom to the moveable member. The flexural pivot member may be arranged for preventing the moveable member from moving along at least one axis. The flexural pivot member can be a flexure, a flexural bearing, a flexure hinge, a bending hinge, a pin flexure, a blade flexure, a notch flexure, a flexure spring, a bendable pivot or the like. Many variants are envisaged. Advantageously, the flexural pivot member may be configured to allow only a tilting and/or tipping motion of the moveable member. By means of the second magnets a moment or torque imparted on the moveable member held by the flexural pivot member can be controlled thereby enabling controlled tilting and/or tipping motion of the moveable member with respect to the base member of the actuating device. The flexural pivot members exhibit high durability and can remain fatigue-proof when only stressed within predetermined displacement limits.

The flexural pivot member may be arranged to provide support such as to prevent the moveable member from moving up and down. In this way, the moveable member may be constrained such that only a tip and/or tilt motion is allowed.

Furthermore, the actuating device can be configured to generate torque in two directions so as to enable tilting of the moveable member in two directions. For this purpose at least two second magnets can be arranged. The flexural pivot member can be arranged to bend in two directions, providing a flexible bearing. The moveable member can then be accurately orientated in multiple directions by controlling electrical current going through the plurality of second magnets.

Since the moveable member is suspended by the flexural pivot member and allowed to rotate or pivot in certain predetermined directions (e.g. allowing it to tip and tilt), an improved controllability may be obtained.

Eddy currents along magnetic flux paths of magnetic flux loops can be reduced by providing soft magnetic materials, for example made from iron particles. Other soft magnetic materials are also possible. The at least one second magnet can comprise a coil with soft magnetic cores. In the middle of the base member the at least one first magnet can be mounted. The moveable member can be made of a soft magnetic material. The at least one first magnet can be arranged to generate a bias flux in the (air) gap between the moveable member and the cores of the coils of the at least one second magnet. By applying a counter-directional current through the at least one second magnet (i.e. through the coils), a flux imbalance can be created which effectively generates a torque on the moveable member. The generated torque on the moveable member can be converted to a rotational/pivotal motion of the moveable member via the limited rotational stiffness of the flexural pivot member.

Optionally, the flexural pivot member is formed by a central support member holding the moveable member. The flexural pivot member may be elongated and extending from the base member towards the moveable member for suspending the moveable member while allowing at least one pivotal degree of motion by bending/flexing.

It is appreciated that heat generated in operation by the actuating device may be limited, compared to for example piezoelectric actuators which generate excessive heat especially in high bandwidth and high acceleration conditions. Also, a high-voltage amplifier may not be required for electrically actuating the actuating device.

The moveable member is suspended by a flexural pivot member which is configured to be moveable by means of non-contacting electromagnetic drives around at least one pivot or rotation axis. Advantageously, it is not required to use linear motion or slideably arrangements for positioning the moveable member. The actuating device may facilitate the generation of a torque that may be substantially linear with respect to the excitation current provided to the at least one second magnet. This linearity may provide improved controllability.

Optionally, an article/object such as a mirror may be connected to the moveable member. In this way, the article/object may be positioned by moving the moveable member.

The first magnet may be a ring magnet, for instance arranged around a centrally positioned flexural pivot member.

Optionally, the flexural pivot member is a longitudinal flexural pivot member such as a pin, strut, beam, rod or the like.

Optionally, the flexural pivot member is arranged in a vertical direction extending between the base member and the moveable member, wherein the flexural pivot member is arranged to provide an increased stiffness in the vertical direction so as to constrain vertical movement of the moveable member with respect to the base member, and a decreased bending stiffness in at least one tip/tilt direction allowing rotational movement of the moveable member with respect to the base member. The flexural pivot member thereby provides the at least one rotational degree of freedom as unconstrained degree of freedom, while at the same time constraining translation in the vertical direction, in accordance with the first aspect above.

Optionally, the flexural pivot member is configured to provide a rotational stiffness to the moveable member and bias the moveable member towards a biasing position.

It is appreciated that the magnetic circuit of the actuating device may provide for a negative stiffness. The flexural pivot member, on the other hand, provides for a positive stiffness (bias towards a non-bending position). Preferably, the flexural pivot member has a higher stiffness than the magnetic circuit. The flexural pivot member can provide a guide for rotation of the moveable member.

The flexural pivot member is configured to be compliant in specific degrees of freedom for allowing pivotal movement of the moveable member with respect to the base member. Furthermore, the pivot member can be configured to bias the moveable member towards a central biasing position (e.g. neutral/initial position). By using the flexural pivot member, pivot wear and contact stresses can be reduced or eliminated. In this way, degradation in performance with time can be avoided, while maintaining a desired preload or bias towards an initial or balanced position. The flexural pivot member provides frictionless adjustment of the orientation of the moveable member. Complex motions and relatively long travel distances are possible.

The actuating device may provide a non-contacting electromagnetic actuation of the moveable member for high-precision motion control. The flexural pivot member can suspend the moveable member while eliminating friction and/or stiction. Furthermore, positioning hysteresis due to friction may be avoided by means of the flexural pivot member holding the moveable member.
Advantageously, much lower resolution limits can be obtaining (nanometer scale), because the flexural pivot member depends on bending and/or flexing of a portion thereof, rather than surface interaction of a plurality of parts (as with a ball bearing for example).

The flexural pivot member may be arranged to provide a constraint by eliminating unwanted degrees of freedom. Additionally or alternatively, the flexural pivot member may provide damping for the steering mirror such as to reduce or eliminate (unwanted) vibrations or oscillations of the object connected to the moveable member. This may in particular be of great importance in optical applications such as for a steering mirror.

Optionally, the actuating device comprises a position sensor and a control unit, wherein the position sensor is configured for measuring a position of the moveable member, wherein the control unit is configured to control the second magnet actuation signal for minimizing a difference between an actual position of the moveable member detected by the position sensor and a desired position of the moveable member.

The position sensor can be configured to continuously monitor the position and/or orientation of the moveable member with respect to a reference of the actuating device. A reference may be chosen as a portion of a frame of the actuating device, a surface of a housing arranged for surrounding components making up the actuating device, or other reference locations. The position sensor can be configured to provide sensory data to the control unit of the actuating device.

One or more position sensors may be configured to measure a displacement of the moveable member and/or the object/article connected thereto (e.g. mirror). The one or more position sensors may be located beneath the moveable member, for example located beneath one or more lateral portions or corners of the moveable member or the object/article connected thereto. For this purpose, a space or gap may be arranged between a bottom portion of the moveable member and the one or more position sensors.

The position sensors may be capacitive position sensors configured for determining a distance to the moveable member. It is appreciated that other sensors may also be used, such as for example an optical sensor, inductive sensor, angle sensor, laser sensor, etc. A combination of position sensor types is also possible. In an example, a linear position sensor is utilized such as to provide linear measurements that may be easily converted to angle measurements of the moveable member.

The control unit may be configured to receive a desired orientation of the moveable member. The actual orientation of the moveable member may be compared to said desired orientation, wherein a difference between the actual orientation of the moveable member and the desired orientation of the moveable may be derived. From this it can be determined which angles have to be changed in order to determine the current that needs to go through the second magnets for moving the moveable member to the desired orientation. Orientation angles may be determined from sensory data obtained from the one or more position sensors. The control unit can provide a control signal for adjusting the resulting flux, such as to control tilting and/or tipping of the moveable member. Various signal processing methods may be employed. The control signal may be sent to a power amplifier configured for amplifying the control signal for forwarding to the electromagnets arranged in the actuating device. An (optionally) amplified control signal may be received by the winding of an electromagnet thereby controlling the movement of the moveable member such as to orient it in a desired position.

The control unit may be arranged to determine the difference between the actual and desired orientation of the moveable member in real-time. An actual angle of the moveable member, as determined by the position sensor, can be transmitted to the control unit for comparison to a requested angle of the moveable member. The control unit may be capable of receiving the actual movement information in real-time and create corrective moveable member movement information in accordance with the desired movement. The corrective movement information can used to create new control signals that can be transmitted to the second magnets. A closed loop control system can be used for determining of the corrective movement information. It is appreciated that other control methods are also possible.

Advantageously, the electromagnetic actuating device may achieve high bandwidths, a high stiffness and/or a high acceleration, while providing a high-resolution positioning (accuracy). The overall design of the actuating device can be made robust and compact while providing a high energy efficiency.

Optionally, the flexural pivot member is arranged for suspending a central portion of the moveable member.

Advantageously, the first magnet may be arranged on a central portion of the base member, below the flexural pivot member centrally holding the moveable member. In an advantageous way, the first magnetic flux induced by the first magnet may not change significantly with the moveable member position.

The first magnet, may be configured to generate a direct current (DC) or steady state first magnetic flux.

Optionally, the at least one first magnet is a permanent magnet.

The magnetic flux provided by the permanent magnet may act as a biasing flux.

Alternatively, the at least one first magnet is an electromagnet configured for providing the first magnetic flux to be substantially constant in use, the first magnet being further configured for receiving a controllable first magnet actuation signal for setting the first magnetic flux.

Advantageously, the constant first magnetic flux may be adjustable and set to a selected constant value during use. By controlling the first magnetic flux by means of the first magnet actuation signal an improved position adjustability of the moveable member can be obtained. Furthermore, external influences or effects on the first magnetic flux may be actively compensated so as to obtain a constant first magnetic flux during use of the actuating device.

Optionally, the at least one first magnet is current controlled simultaneously with at least one second magnet.

The at least one second magnet is configured to provide an adjustable alternating current (AC) flux generated by a coil of an electromagnet. The induced magnetic induction field generated by the excitation current provided to the electromagnet(s) of the at least one second magnet flows according to the at least one second magnetic closed flux path. The excitation current through coil windings of the electromagnet(s) of the at least one second magnet may generate a net actuation force being proportional to the current which provides a torque on the moveable member suspended by the flexural pivot member. The net torque may be acting in an opposite direction by reversal of the direction of the current through the coil windings of the electromagnet. In this way, at least a bi-directional pivotal motion of the moveable member being suspended by the flexural pivot member can be obtained. The windings may have a conductive wire connected thereto for providing an electrical current.

The flexural pivot member may be configured to constrain unwanted degrees of freedom of the moveable member (and hence the optional object connected thereto, such as a mirror).

The flexural pivot member may provide repeatable positioning operations with reduced wear and fatigue. The need for support bearings which tend to suffer from mechanical wear or fatigue after repetitive uses can be eliminated by employing the flexural pivot member.

Optionally, the at least one first magnet is configured to provide a first magnetic flux in the at least two first magnetic closed flux paths for positioning the moveable member in a balanced position, wherein the second magnet is configured to provide the second magnetic flux in the at least one second magnetic closed flux path for modifying the resulting magnetic flux in the one or more of the at least two first magnetic closed flux paths such as to change the balanced position for changing an orientation of the moveable member.

As a result of the first magnetic flux provided by the first magnet, the moveable member may be positioned in an initial position. The moveable member being suspended by the flexural pivot member may be balanced so as to settle into this position of most favorable reluctance. By providing the second magnetic flux provided by the at least one second magnet, a moment or a rotational force may be generated disturbing the equilibrium position. The flexural pivot member may automatically pre-load or bias towards the initial equilibrium position in which it is not flexed or bent. The relative position of the moveably member can be accurately adjusted by actuating the at least one second magnet.

The flexural pivot member can be a monolithic structure arranged for providing a desired stiffness for the suspension of the moveable member and to enable a relative motion or displacement of the moveable member with respect to at least the base member by means of bending or flexing.

The flexural pivot member may be arranged to provide a revolute bending joint connecting the base member with the moveable member. The flexural pivot member may provide well-behaved kinematic and dynamic characteristics without friction (Coulomb), backlash and stick-slip behavior which would be detrimental for precise control of the motion or displacement of the moveable member. Such behavior, which could result in the presence of nonlinearities can be effectively eliminated by suspension of the moveable member using the flexural pivot member. In this way, an effective and accurate position and force control can be obtained, while providing small-scale positioning, such as micro-scale or nano-scale positioning.

Optionally, the at least one first magnet and the at least one second magnet may be arranged such that the at least one second magnetic closed flux path encloses the at least two first magnetic closed flux paths. In this way, a magnetic circuit is obtained which in which the torque applied on the moveable member can be controlled by controlling the at least one second magnetic closed flux path;

The flexural pivot member allows a certain degree of flexing or bending enabling a rotational or pivotal motion of the moveable member. It is appreciated that the actuating device enables control over at least one degree of freedom. However, control can be easily extended to more degrees of freedom.

Advantageously, the flexural pivot member can provide two degrees of freedom, e.g. rotation about a X-axis, and rotation about a Y-axis. In this way, the moveable member or article/object connected thereto can be positioned in various orientations for example for steering a laser beam when used in a steerable mirror.

Optionally, the at least one first magnet is arranged centrally on the base member or moveable member, wherein the at least one second magnet includes at least one pair of second magnets arranged on the base member or moveable member, wherein the at least one first magnet is positioned between magnets of the at least one pair of second magnets.

Optionally, the at least one second magnet includes at least one magnet extending along a first direction and at least one magnet extending along a second direction, wherein the first direction is different than the second direction.

In an example, the second magnets extending along different directions are arranged centrally. In a further example, pairs or multiples of second magnets may be arranged with individual second magnets for example decentralized. Any workable arrangement of second magnets that results in a stable operation of the actuator device may be applied. For example, optionally, the at least one second magnet includes at least a first pair of second magnets extending along a first direction and a second pair of second magnets extending along a second direction, wherein the at least one first magnet is positioned between the magnets of the first and second pairs of second magnets, wherein the first direction is different than the second direction.

Both the first and second pair of second magnets may function in a similar fashion and can have the same components.

Optionally, the first and second directions are mutually transverse.

Optionally, the at least one second magnet includes three magnets each extending along a different direction, wherein preferably the three second magnets are spaced at an interval of 120 degrees relative to each other.

Optionally, the at least one second magnet includes a first pair of second magnets extending along a first direction with the at least one first magnet therebetween, and one additional second magnet extending along a second direction different than the first direction.

Optionally, the at least one second magnet is arranged centrally on the base member or moveable member, wherein the at least one first magnet includes at least one pair of first magnets arranged on the base member or moveable member, wherein the at least one second magnet is positioned between magnets of the at least one pair of first magnets.

Optionally, with respect to either one or both of the first and second magnets, a single magnet is used instead of a pair of magnets. Furthermore, instead of two magnets in a pair, a larger number of magnets may be used, for instance three magnets, four magnets, five magnets, etc. The magnets may be discrete magnets which can be controlled together or separately. A combination of permanent magnets and electromagnets may also be employed.

Optionally, the at least one second magnet comprises a pole shoe on which the at least one first magnet is positioned.

In this way, smaller radial space may be required by the actuating device, resulting in a more compact construction design of the actuating device.

Optionally, a mirror is connected to the moveable member, wherein the device is configured to controllably orientate the mirror by tip and/or tilt actuation. As may be appreciated, the actuating device may be a separate device to which such a mirror is attached, or may be integrated in a system of devices, such as a array of controllable mirrors. Moreover, the actuating device is not limited to the application of mirror position control but may be use for controlling positions of other instruments or devices, as explained elsewhere in this document.

The flexural pivot member may comprise a rigid portion which provides the fixed support to the base member and a flexible portion which exhibits a certain degree of flexibility and provides an interconnection between the flexural pivot member and the moveable member.

According to an aspect, the invention further relates to a steerable mirror unit comprising the actuating device, wherein the steerable mirror unit comprises a mirror attached to the moveable member.

The flexural pivot member is mounted in the actuating device for suspending the moveable member. The flexural pivot member is connected to the base member for enabling the moveable member to pivotally move with respect to the base member.

The actuating device may for example be part of an optical deflection unit comprising a deflection mirror, such as a steerable mirror which is used to reflect light from a laser or lamp along a certain path. The moveable member may move together with the object/article fixed thereto (e.g. mirror). In this way, the moveable member and object may be considered as a single moving portion of the device.

The moveable member may be at least partially made out of conductive material, while the mirror is not made out of a conductive material. However, also the mirror may be at least partially be made of a conductive material.

The mirror may be round, rectangular or any shape. It may be flat or curved. Curved may be spherical, cylindrical or a special curve. The mirror may comprise a plurality of segment surfaces. The mirror may be removeable from the actuating device. The steerable mirror may have a modular design, allowing replacement of the mirror with another mirror.

The actuating device may provide a simple control, little wear and tear, high temperature stability, high durability and realization of large deflections in a compact design for the steerable mirror unit.

According to an aspect, the invention further relates to a method for positioning a moveable member, the method comprising providing a magnetically conductive base member arranged opposite the moveable member with a gap provided therebetween, wherein the moveable member is pivotally arranged with respect to the base member. The moveable member and the base member are magnetically conductive such as to allow one or more magnetic closed flux paths. The method further comprises providing at least one first magnet configured for providing a first magnetic flux through the base member and the moveable member such as to provide at least two first magnetic closed flux paths, and providing at least one second magnet configured for providing a second magnetic flux through the base member and the moveable member such as to provide at least one second magnetic closed flux path, wherein the at least one second magnet is an electromagnet. The at least one second magnet is configured for receiving a controllable second magnet actuation signal for controlling the second magnetic flux for changing, in one or more of the at least two first magnetic closed flux paths, a resulting magnetic flux provided by the first magnetic flux and the second magnetic flux for pivoting the moveable member. The moveable member is pivotally suspended opposite the base member by means of a flexural pivot member which is arranged to provide one or more unconstrained degrees of freedom for the moveable member and one or more constrained degrees of freedom for the moveable member. The one or more unconstrained degrees of freedom include at least one rotational degree of freedom, and the one or more constrained degrees of freedom include at least a translational degree of freedom in a longitudinal direction of the flexural pivot member.

The flexural pivot member provides a linkage with a high compliance with respect to one or more rotational degree of freedom (DOF) and high stiffness in all other DOFs. The motion of the flexural pivot member is achieved by an elastic deformation of a solid material rather than a (ball) bearing or rigid joint, for example used in rigid-body kinematics. Advantageously, the flexural pivot member can easily be manufactured in one piece (monolithic or unitary). However, the flexural pivot member may also comprise different parts connected to each other, the parts for example having an other stiffness/flexibility. The flexural pivot member provides for a virtual infinite resolution in movement, motion smoothness and zero backlash. Furthermore, also the weight of the actuating device can be reduced by employing the flexural pivot member.

The actuating device may provide generate a torque on the moveable member suspended by the hinge, such as to allow a range of movement of the moveable member. This movement can be accurately controlled by influencing the first and/or second magnetic flux closed paths going through the base member and the moveable member.

The actuating device may allow micro-positioning of the moveable member by pivotal movement of the moveable member by flexing/bending at least an end portion of flexural pivot member connected to the moveable member. The flexural pivot member of the actuating device may be configured to enable positioning of the moveable member in multiple directions about a single point of pivot. The flexural pivot member may be arranged to enable tilting/tipping movement of the moveable member.

By employing at least one permanent first magnet and at least one second magnet comprising windings (i.e. electromagnet), a low power, high speed, low audible noise lightweight actuating device may be obtained. Also the costs of the actuating device can be reduced, while providing improved controllability. Advantageously, the flexural pivot member may enable complex tip/tilt movement of the moveable member, without requiring including a plurality of individually moveable actuators.

The flexural pivot member of the actuating device may be modified to provide for more or less degrees of freedom for the moveable member, depending on the application.

It is appreciated that the actuating device may also operate upside down or tilted and may be substantially independent of gravitational forces. It is appreciated that devices being operated in a zero-gravity environment, such as satellites and spacecraft, can be particularly sensitive to bearing friction (cf. Coulomb-type), primarily because gravity is no longer the dominate mechanical influence. Hence, since the frictional forces are substantially eliminated by employing the flexural pivot member, the actuating device is also advantageous for use in zero-gravity environments.

The moveable member can be made of a material classified as ferromagnetic, for example, iron. Other magnetic materials can also be used. The mass of the moveable member may be reduced such as to reduce the reaction force and increase acceleration during actuation. The moveable member may be manufactured from lightweight materials.

The flexural pivot member may also be manufactured from lightweight materials, such as for example titanium, aluminum, magnesium, fiberglass and perhaps also sheetmetal, magnetic or unmagnetic, and the like. Other materials may also be used.

The actuating device may provide for a fast positioning system which can be employed in various applications, for example for fast steering mirrors, laser pointing systems, optical deflection systems, beam guidance systems, acousto-optic steering systems, surface emitting laser steering systems, ultraviolet exposure systems, extreme ultraviolet lithography systems (semiconductor fabrication), optical instrumentation, interferometers, etc. However, other fields or applications are also envisaged, such as for example tomography systems, optical deflection units for targeted radiation (e.g. medical), optical systems for medical measurement and/or therapy, etc. The actuating device may achieve nano-scale actuation and/or precision positioning.

The actuating device is an electromagnetic device which can operate at high speed while allowing precise control of the moveable member, and hence also other articles connected or attached to the moveable member. The actuating device may for example operate at speeds higher than 1 kHz, preferably higher than 5 kHz, more preferably higher than 10 kHz, while providing angular position precisions on the order of 10 μrad, more preferably on the order of 1 μrad, and even more preferably on the order of 0.1 μrad. Additionally or alternatively, the actuating device may provide position precisions on the order of 10 nanometer, preferably on the order of 1 nanometer, more preferably on the order of 0.1 nanometer. Even higher precisions may be achieved.

Optionally, the flexural pivot member is constructed of a monolithic material or unitary one-piece monolithic body. Optionally, the flexural pivot member and the base member can be constructed of a monolithic material or unitary one-piece monolithic body. Optionally, the flexural pivot member and the moveable member can be constructed of a monolithic material or unitary one-piece monolithic body. It is also possible that the flexural pivot member comprises a plurality of parts connected to each other. For example, a part may be formed by an upper flexible attachment portion, and an other part may be formed by a rigid portion attached to the base member.

The actuating device may provide an improved simplicity, durability, robustness, improved reproducibility as well as decreased aging and temperature effects. In addition, the optical deflection unit should be capable of realizing relatively large deflections in the range of 0.5-5° in one or more deflection dimensions with a compact design.

It will be appreciated that any of the aspects, features and options described in view of the device apply equally to the method and the described steerable mirror. It will also be clear that any one or more of the above aspects, features and options can be combined.

BRIEF DESCRIPTION OF THE DRAWINGS

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the Drawing.

DETAILED DESCRIPTION

Figure 1:
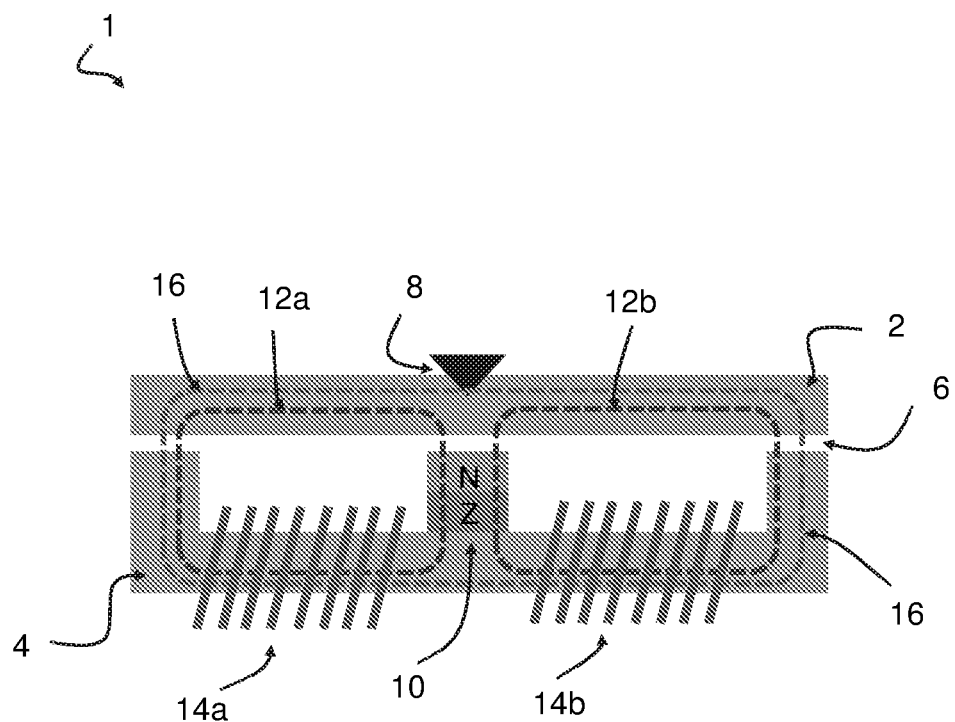
FIG. 1 shows a schematic diagram of a side cross-sectional view of an embodiment of an actuating device.

FIG. 1 shows a schematic diagram of a side cross-sectional view of an embodiment of an actuating device 1. The actuating device 1 is arranged for positioning a moveable member 2. The actuating device 1 comprises a magnetically conductive base member 4 arranged opposite the moveable member 2 with a gap 6 provided therebetween. The moveable member 2 is pivotally suspended opposite the base member 4 by means of a flexural pivot member 8. The moveable member 2 and the base member 4 are magnetically conductive such as to allow one or more magnetic closed flux paths. In this way, a magnetic circuit can be obtained. The actuating device 1 further comprises at least one first magnet 10 configured for providing a first magnetic flux through the base member 4 and the moveable member 2 such as to provide at least two first magnetic closed flux paths 12a, 12b. In this example, the first magnet 10 is located beneath a central portion of the moveable member 2. The actuating device 1 further comprises at least one second magnet 14 configured for providing a second magnetic flux through the base member 4 and the moveable member 2 such as to provide at least one second magnetic closed flux path 16, the at least one second magnet being an electromagnet. In this example, the actuating device 1 comprises two second magnets 14a, 14b. However, it is also possible that only one second magnet 14 is arranged in the actuating device 1. The two second magnets 14 are configured for receiving a controllable second magnet actuation signal for controlling the second magnetic flux for changing, in one or more of the at least two first magnetic closed flux paths 12a, 12b, a resulting magnetic flux provided by the first magnetic flux and the second magnetic flux for pivoting the moveable member 2 by means of the flexural pivot member 8. The arrow tips indicate the direction of the magnetic fields of the magnetic closed flux paths.

A flexural pivot member 8 allows displacement between objects, namely the base member 4 and the moveable member 2, without the need for motion at mechanical interfaces, such as for instance sliding contacts or pinned connections, reducing the amount of friction of the joint. The flexural pivot member 8 can connect the base member 4 with the moveable member 2, having at least an elastic portion which is configured to flex at a predefined location, or in a predictable shape, thus creating an elastic flexural hinge. Kinematic characteristics of the flexural pivot member 8 are determined by its dimensions and material properties. Examples of kinematic characteristics are range of motion, pivot point location, degree of freedom, strength of the joint and stiffness. The flexural pivot member 8 is arranged to provide a high stiffness in one or more constrained degree of freedom (DOF), combined with relatively low stiffness in one or more unconstrained degree of freedom. The absence of joints that e.g. slide and pivot relative to each other permits a linkage which can achieve motion without Coulomb friction, eliminating the stick-slip nature of a friction bearing, thus enabling motion with high resolutions (e.g. nano-scale). This is particularly beneficial for high-precision applications, such as for example a fine steerable mirror.

The actuating device 1 is an electromechanical device arranged for converting electrical work into mechanical work. Such actuation is also known as a reluctance based actuation. The magnetic field lines travelling through the magnetic conductive material of the base member 4 and the moveable member 2 tend to travel the path of the least reluctance. The (empty) space between the moveable member 2 and the base member 4 may enable a reluctance gap 6. The gap 6 has a lower magnetic permeability, resulting in a higher reluctance. If the gap is too large, the reluctance is too large such that the magnetic field lines are not able to jump the gap 6 (which would resulting in an open circuit). Therefore the gap 6 is configured to be sufficiently small to enable a closed magnetic circuit, in use. Since the magnetic field lines want to travel the path of least resistance/reluctance, a torque can be exerted on the magnetically permeable material of the moveable member 2 being suspended by the flexural pivot member 8.

The flux follows a predetermined path, indicated by dashed lines in FIG. 1, and is confined by the geometry of the actuating device 1, in particular the base member 4 and the moveable member 2. The gap 6 may be an air gap. It is appreciated that the magnetic flux lines may go from the base member 4 through the gap 6 to the moveable member 2 and vice versa provided that the (air) gap is sufficiently small. Also a gap is formed between the centrally arranged first magnet 10 and the moveable member 2. For example, the air gap may be substantially smaller than other core dimensions or the dimensions of neighboring pieces, i.e. length and width of the cross sectional area of the core above and below the (air) gap 6. In an example, an elastic material is positioned in the gap between the moveable member 2 and the base member 4.

The moveable member 2 may experience a magnetic flux density going therethrough to form a closed magnetic flux path. When the magnetic flux density is changed by means of the at least one second magnet 14a, 14b, a mechanical force may be generated which can displace the moveable member 2 in a degree of freedom allowed by the flexural pivot member 8. As a result of the moveable member 2 being suspended by the flexural pivot member 8, the mechanical force may result in a torque configured to effectively position the moveable member 2 in a desired position/orientation. The movement of the moveable member is controlled and/or adjusted by means of controlling and/or adjusting the magnetic flux in the magnetic circuit. The actuating device 1 may comprises a controller (not shown) for controlling the operation of the actuating device 1. The controller may be arranged for varying the magnitude of an electrical current provided to the second magnets 14a, 14b (actuation of electromagnet). An second magnets 14a, 14b (electromagnets) may be formed by a coil or solenoid having a core and a winding set. A high positioning accuracy at a fast response speed can be achieved by the actuating device 1. The power consumption of actuating device 1 can also be significantly reduced or minimized.

The permanent first magnet 10 can generate a magnet flux which travels in two directions of equal magnitude. In an example, the second magnets 14a, 14b are configured to receive the same electrical excitation current. In this way, the second magnets 14a, 14b can be provide a rotational actuation to the moveable member 2 resulting in bending or flexing of the flexural pivot member 8 and hence tip/tilt movement of the moveable member 2.

In this example, one of the second magnets 14a is located between a lateral portion of the base member 4 and a central portion of the base member 4, and the other second magnet 14b is located between an opposite lateral portion of the base member and the central portion of the base member 4. The actuating device 1 may be configured to provide for tipping and/or tilting of the moveable member 2 using the flexural pivot member 8 having at least two degrees of freedom for motion under actuation. By changing the current through a winding set of the second magnets 14a, 14b, the moveable member 2 can be effectively displaced or steered. The result of superposing the second magnetic flux resulting from the second magnets 14a, 14b with the permanent magnet flux of the first magnet 10, is movement of the moveable member 2 in the direction where both the second magnetic flux and the permanent magnet flux are in the same direction. This applies a moment to the moveable member 2 resulting in an angular acceleration or displacement.

In an example, motion of the moveable member in different direction may be controlled by controlling the second magnets in unison.

In the shown example, the two second magnets 14a, 14b each have a winding. The permanent first magnet 10 is located between at least a portion of the first winding and a second winding of the second magnets 14a, 14b. The second magnets 14a, 14b are located opposite each other having the first magnet therebetween, and may be energized with a same polarity, for example both energized in positive polarity or negative polarity. The second magnetic closed flux path 16 encloses the two first magnetic closed flux paths 12a, 12b.

The second magnets 14a, 14b enable a rotation of the moveable member 2 at least about a first rotation axis. Optionally, the actuating device includes further second magnets for enabling a rotation of the moveable member 2 at least about a second rotation axis different than the first rotation axis.

The flexural pivot member 8 can achieve a balancing effect. In this example, the moveable member 2 may be automatically centered.

The flexural pivot member 8 may provide a flexure support or suspension which is permitted to bend to some extent. It may be in the form of a flexure cantilever leg, pin or rod having at least a portion which is allowed to bend or flex for enabling the moveable member 2 to pivot with respect to the base member 4 under the influence of actuation by means of the at least one second magnet 14a, 14b. The flexural pivot member 8 can be configured to enable operative motion of the moveable member 2 within predetermined movement limits. Preferably, the flexural pivot member 8 is arranged centrally and is configured to attach to a central portion of the moveable member 2, improving simplicity and enhancing stability and/or balance. In this way, also an improved controllability may be obtained since balancing can be facilitated. The actuating device 1 provides for a precision electromagnetic drive for providing precise relative movement of the moveable member 2.

Figure 2:
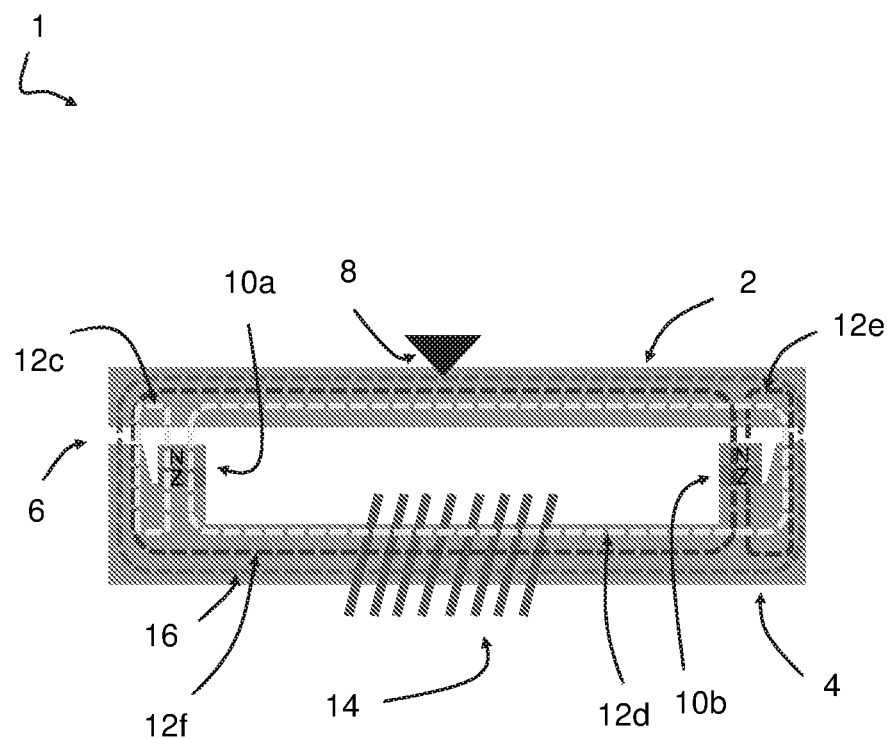
FIG. 2 shows a schematic diagram of a side cross-sectional view of an embodiment an actuating device.

FIG. 2 shows a schematic diagram of a side cross-sectional view of an embodiment an actuating device 1. In this example, the at least one second magnet 14 is arranged centrally on the base member 4. It is appreciated that the second magnet may alternatively or additionally be arranged centrally on the moveable member 2. Furthermore, the actuating device 1 comprises two first magnets 10a, 10b (permanent magnets). The first magnets 10a, 10b are arranged on the base member 4. The second magnet 14 is positioned between the two first magnets 14a, 14b. It is appreciated that the first magnets 10a, 10b may additionally or alternatively be arranged on the moveable member 2. The moveable member 2 has a rotary configuration with respect to at least the base member 4 by means of the flexural pivot member 8. A gap 6 is arranged between a top portion of the base member 4 and a bottom portion of the moveable member 2.

The electrical actuation current provided to the second magnet 14 is controlled for positioning the moveable member 2. The torque experienced by the moveable member 2 is determined by the flux density in the magnetic circuit. The actuating device 1 enables to effectively and simply control the positioning of the moveable member 2 in an accurate fashion.

The two first magnets 10a, 10b each provide two magnetic closed flux paths 12c and 12d, and 12e and 12f, respectively. The second magnet 14 provides a magnetic closed flux path 16. By means of the second magnet 14, the second magnetic closed flux path 16 can be changed, and hence a moment/torque can be applied on the moveable member 2 resulting in an angular acceleration and/or a rotary or tilting deflection.

In an example, the flexure-based actuating device 1 includes a feedback control mechanism which is configured to monitor the orientation of the moveable member 2 and provide a feedback signal to adjust the moveable member 2 position and/or stabilize the moveable member 2 position at a desired position against any fluctuations or drifts in a desired moveable member 2 position.

Advantageously, also in this example, the flexural pivot member 8 may be lubrication-free and/or free of dynamic and rolling friction. In this way, the actuating device may be low in wear and tear and requiring no bearing lubrication.

Figure 3:
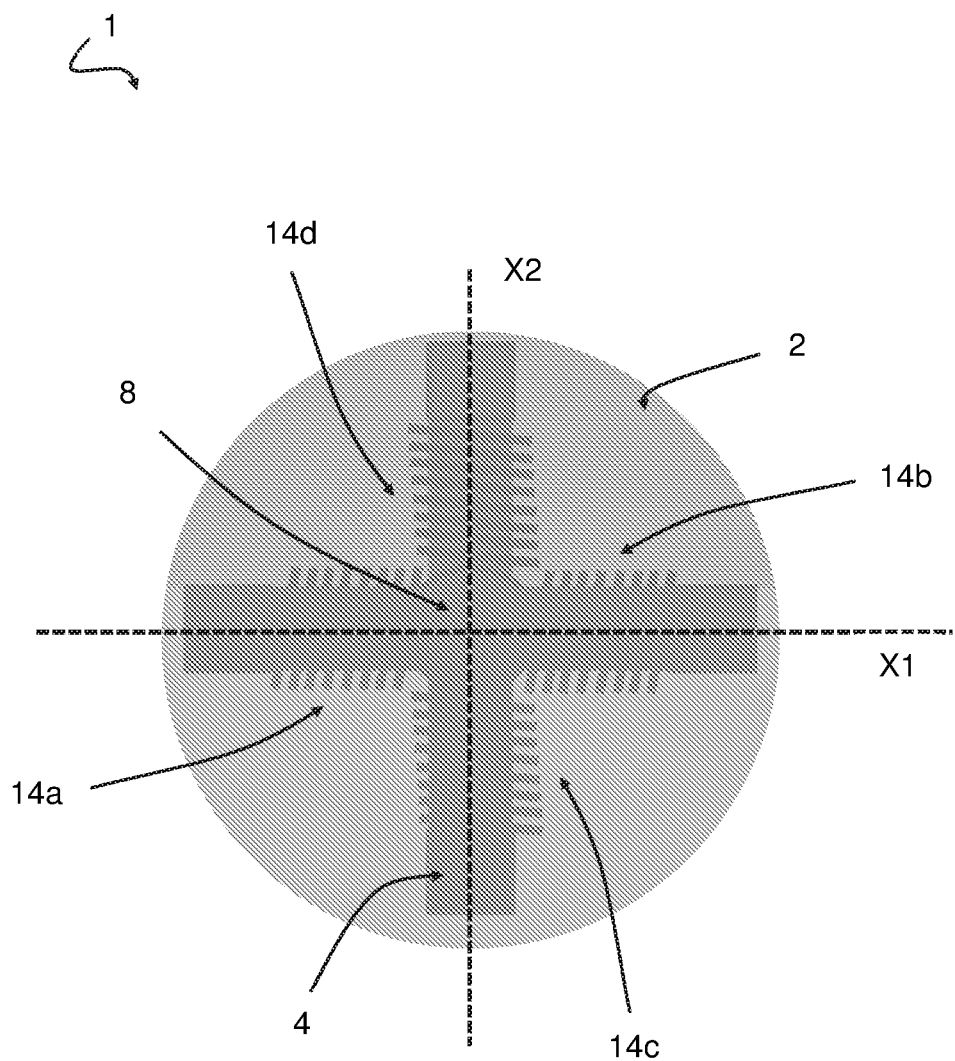
FIG. 3 shows a schematic diagram of a top view of an embodiment of an actuating device.

FIG. 3 shows a schematic diagram of a top view of an embodiment of an actuating device 1. A plurality of second magnets 14a, 14b, 14c, 14d are arranged. In this example, four second magnets 14a, 14b, 14c, 14d are arranged, wherein two second magnets 14a, 14b are arranged in a first direction X1 and two second magnets 14c, 14d are arranged in a second direction X2. The second magnets may be controlled in pairs. For instance, a first pair of second magnets 14a, 14b may be controlled together and a second pair of second magnets 14c, 14d may be controlled together so as to pivotally control positioning of the moveable member 2 in two directions. In an example, each of the second magnets 14a, 14b, 14c, 14d can be controlled independently. In an example, separate current controllers are arranged for each of the second magnets or pairs of second magnets. The flexural pivot member 8 may be configured to prevent unwanted degrees of freedom of the moveable member 2.

It is appreciated that instead of arranging four second magnets 14a, 14b, 14c, 14d, it is also possible to obtain pivotal positioning of the moveable member 2 in two directions employing only two or three second magnets. Advantageously, in this way, a more compact design can be obtained.

Figure 4:
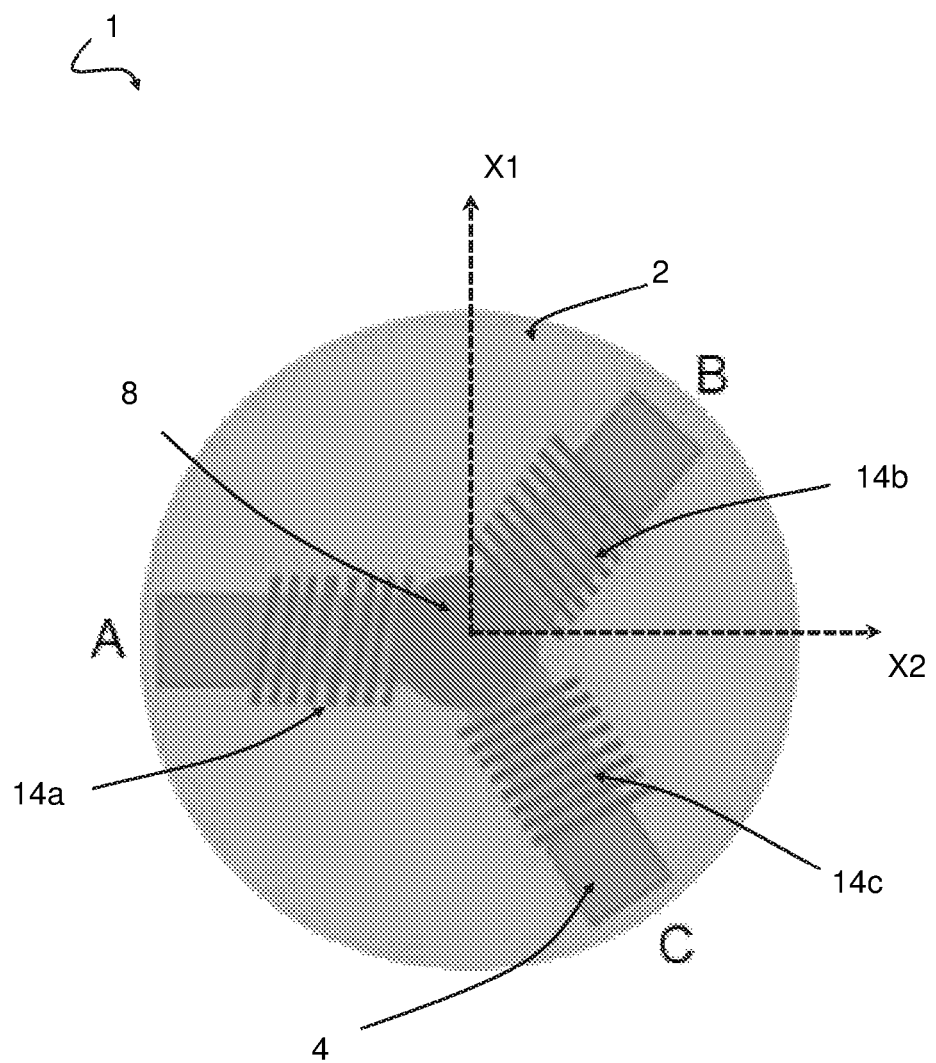
FIG. 4 shows a schematic diagram of a top view of an embodiment of an actuating device.

FIG. 4 shows a schematic diagram of a top view of an embodiment of an actuating device. In this example, pivotal positioning of the moveable member 2 in two directions, namely in the direction of axis X1 and axis X2, is obtained employing three second magnets 14a, 14b, 14c which are spaced at interval of 120 degrees relative to each other. The actuation is distributed around the two axes X1 and X2 over the three second magnets 14a, 14b, 14c. For obtaining a moment/torque around axis X1 and axis X2, different electrical current distributions provided to the second magnets can be employed. The electrical current distribution (e.g. normalized) for a moment around axis X1 can be: $I_A=+1$; $I_B=-0.5$; $I_C=-0.5$. The electrical current distribution (e.g. normalized) for a moment around X2 can be: $I_A=0$; $I_B=+1$; $I_C=-1$.

Figure 5:
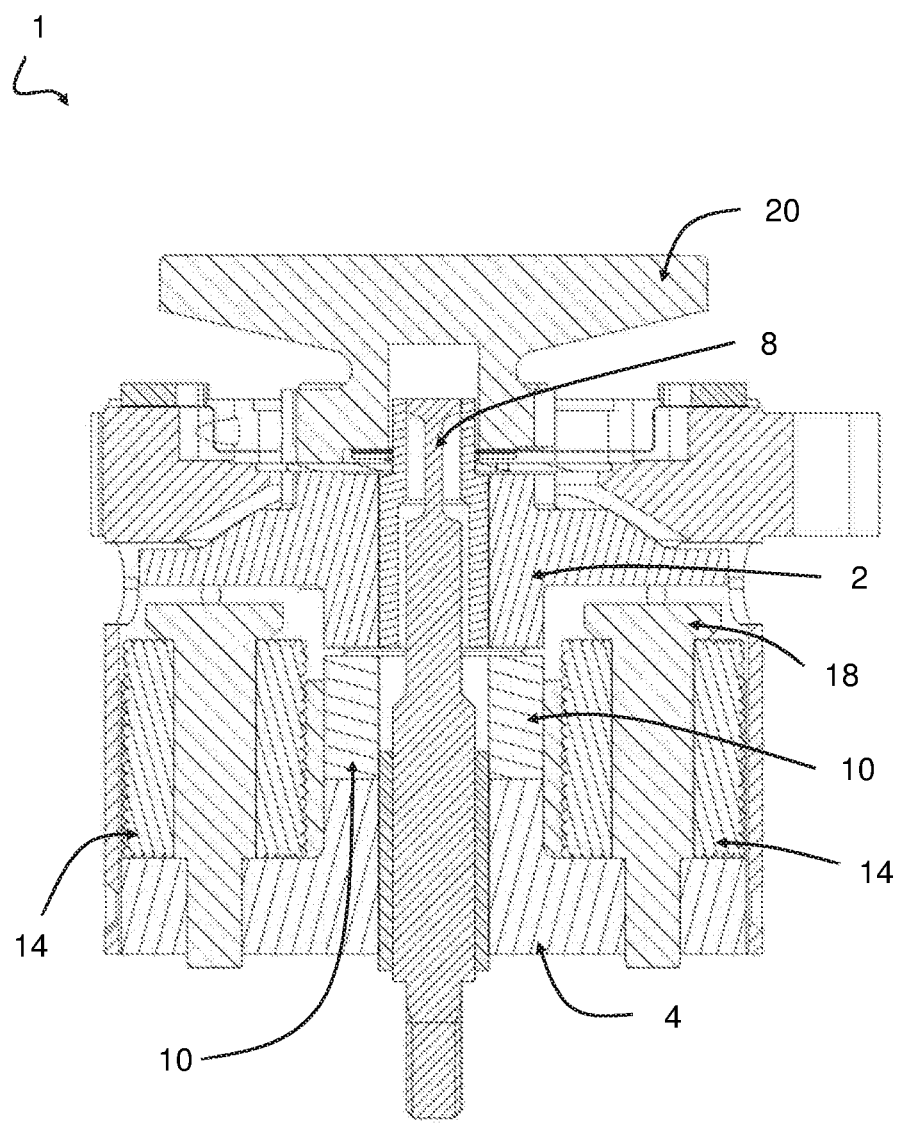
FIG. 5 shows a schematic diagram of a side cross-sectional view of an embodiment of an actuating device.

FIG. 5 shows a schematic diagram of a side cross-sectional view of an embodiment of an actuating device 1. The flexural pivot member 8 forms a rod which is arranged centrally. The flexural pivot member is fixed at one end to the base member 4 and connected to the moveable member 2 at an opposite end. The first magnet 10 is arranged around the flexural pivot member 8. A gap is provided between the first magnet 10 and the moveable member 2. The first magnet 10 may be a ring magnet. Other types of magnets may also be used. Two second magnets 14a, 14b are arranged in connection with the base member 4. The second magnets 14a, 14b are electromagnets and each have a pole shoe 18. A gap is provided between the base member 4 (pole shoe 18 connected to base member 4) and the moveable member 2. The moveable member 2 is arranged for supporting an object/article 20 connected thereto for enabling pivotal movement of the object/article 20 about any one of a number of pivot axes provided by the flexural pivot member. The object/article 20 can for instance be a mirror or a reflective surface. However, other objects/articles may also be connected to the moveable member 2.

The flexural pivot member 8 may form a central vertical strut being configured to hold the moveable member. The flexural pivot member 8 may have a relatively high stiffness in the vertical direction substantially preventing motion in this direction, and a relatively low (bending) stiffness in the tip/tilt direction allowing motion in this direction. In this way, detrimental effects relating to friction, contamination, lubrication, hysteresis, and the like can be avoided or at least reduced. Such detrimental effects are for instance present in case a ball bearing or other frictional bearing are employed. The flexural pivot member 8 may provide improved rotational precision of the moveable member, which is important for precision-required applications.

The actuating device 1 forms a magnetic circuit by means of the first magnet 10 and the two second magnet 14. It is appreciated that an additional second magnet 14 may be arranged for rotation of the moveable member 2 in an additional direction. The second magnet 14 is configured to produce a magnetic field in response to an electrical actuation current provided to its coil. A movement of the moveable member 2 relative to the base member 4 can be obtained in response to the change of the flux in the magnetic circuit of the actuating device 1.

The base member 4 is configured to provide support for the flexural pivot member 8 which is coupled to the moveable member 2 for allowing relative movement between the moveable member 2 and the base member 4. At least a portion of the flexural pivot member 8 can bend/flex for allowing the moveable member to rotate or pivot. In this example, the upper portion of the flexural pivot member 8 is allowed to bend/flex to some extent. Advantageously, the flexural pivot member 8 can be arranged such as to allow rotational movement in at least two orthogonal directions or components thereof, such that the moveable member 2 can for instance move relative to and along a portion of a sphere.

The first magnetic closed path goes through the base member 4 via the (air) gap to the moveable member 2 at a free end portion of the moveable member 2. When the (air) gap distance is changed at a free end of the moveable member 2, then the moveable member may be balanced as a result of the first magnetic flux generated by the first magnet (e.g. constant magnetic flux provided by permanent magnet). Additionally, the flexural pivot member 8 can be self-balanced towards a balancing position. The flexural pivot member 8 can be configured to provide a rotational stiffness to the moveable member 2 and bias the moveable member 2 towards a (central) biasing position. In this example, the biasing position is a central biasing position in which the flexural pivot member 8 is not bent or flexed. In this self-balanced position, preferably the second magnets 14 are not energized. The moveable member 2 can be kept in a balanced position at least partly under the influence of the first magnet 10.

The moveable member 2 and the base member 4 can be manufactured from a magnetically permeable material which conducts and carries magnetic fields. Advantageously, the flexural bearing can be made of titanium.

Figure 6:
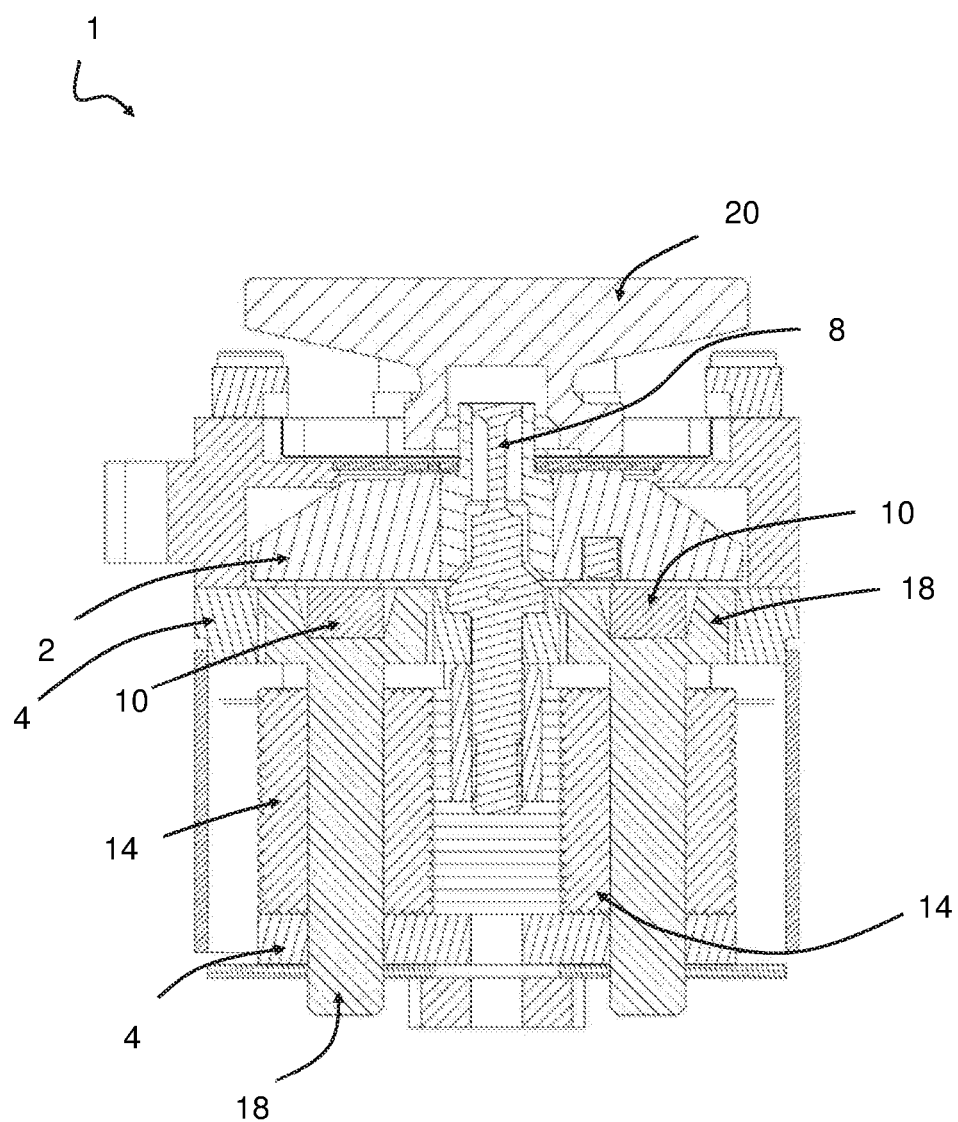
FIG. 6 shows a schematic diagram of a side cross-sectional view of an embodiment of an actuating device.

FIG. 6 shows a schematic diagram of a side cross-sectional view of an embodiment of an actuating device 1. Two second magnets 14 are shown each comprising a pole shoe 18 on which the at least one first magnet 10 is positioned. The two first magnets 10 are positioned on an upper side of the pole shoes 18 facing the moveable member 2. The pole shoes 18 have recess in which the first magnets 10 are arranged. A gap is provided between the first magnets 10 and the moveable member 2. The flexural pivot member 8 is arranged for supporting at least a portion of the moveable member 2 (cf. suspension) such as to allow at least partial relative movement between the base member 4 and the moveable member 2 as a result of bending/flexing.

Also in this embodiment, the moveable member 2 can be configured to interact with an object or article 20, such as for example a mirror. The object or article 20 can be connected to the moveable member 2. In this way, a steerable mirror can be obtained. By adjusting or controlling the electrical current provided to the second magnets 14 (electromagnets), the moment and hence the relative orientation of the moveable member can be changed, so that also the object or article 20 can be positioned. The flexural pivot member is arranged centrally and in the actuating device and allows pivotal motion of the moveable member 2, thereby allowing a tip/tilt movement.

Figure 7:
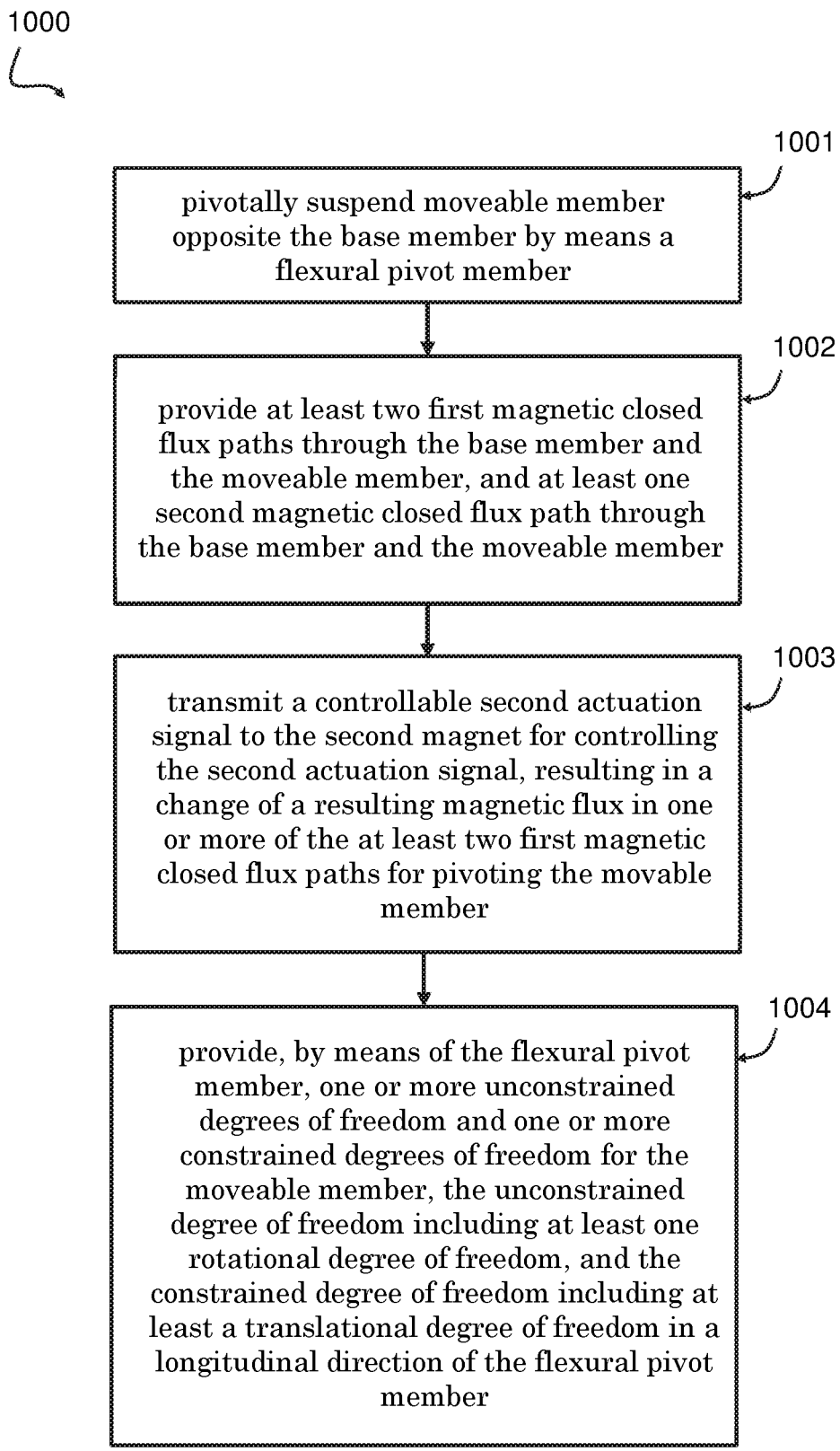
FIG. 7 shows a schematic diagram of a method for positioning a moveable member.

FIG. 7 shows a schematic diagram of a method for positioning a moveable member 2 of the actuating device 1. The method comprises in a first step 1001, providing a magnetically conductive base member 4 arranged opposite the moveable member 2 with a gap 6 provided therebetween, wherein the moveable member 2 is pivotally suspended opposite the base member 4 by means of a flexural pivot member 8. The moveable member 2 and the base member 4 are magnetically conductive such as to allow one or more magnetic closed flux paths. The method further comprises in a next step 1002, providing at least one first magnet 10 configured for providing a first magnetic flux through the base member 4 and the moveable member 2 such as to provide at least two first magnetic closed flux paths 12a, 12b, and providing at least one second magnet 14 configured for providing a second magnetic flux through the base member 4 and the moveable member 2 such as to provide at least one second magnetic closed flux path 16, wherein the at least one second magnet 14 is an electromagnet. In step 1003, the at least one second magnet 14 is configured for receiving a controllable second magnet actuation signal for controlling the second magnetic flux 16 for changing, in one or more of the at least two first magnetic closed flux paths 12a, 12b, a resulting magnetic flux provided by the first magnetic flux and the second magnetic flux for pivoting the moveable member 2 by means of the flexural pivot member 8. The moveable member 2 is pivotally suspended opposite the base member 4 using the flexural pivot member 8. In step 1004, the flexural pivot member 8 provides one or more unconstrained degrees of freedom and one or more constrained degrees of freedom for the moveable member 2. The unconstrained degree of freedom including at least one rotational degree of freedom, and the constrained degree of freedom including at least a translational degree of freedom in a longitudinal direction of the flexural pivot member 8.

It is appreciated that the flexural pivot member can have various shapes and forms. Other types of flexural pivot members may also be used. A flexural pivot member is often simple and inexpensive to manufacture.

It is appreciated that also more complex flexural pivot members may be employed, for instance butterfly flexures, notch-type flexural pivots, parallel beam flexures, cross-axis flexural pivots providing a connection of two rigid segments with two long flexible segments arranged in a cross-shape configuration, split tube flexural pivots with torsion as the primary mode of deformation, etc.

It is appreciated that parts of the actuating device may be fabricated using micro-electro-mechanical (MEMS) fabrication techniques. In this way, the design of the actuating device may be more easily miniaturized.

It is appreciated that the number of second magnets may differ from the number shown in the shown embodiments. Alternatively, there may be more or fewer second magnets in the actuating device. The same reasoning applies for the first magnet(s). Additionally or alternatively, there may be additional or fewer degrees of freedom provided by the flexural pivot member of the actuating device.

It is appreciated that an electromagnet or solenoid can be made from a coil of wire that acts as a magnet when an electric current passes through it but stops being a magnet when the current stops. One or more layers of windings of an electrical conductor may be wound as a helix with a relatively small pitch. Often, the coil is wrapped around a core of 'soft' ferromagnetic material such as steel, which greatly enhances the magnetic field produced by the coil. Ferromagnetic materials may be divided into magnetically soft materials like annealed iron, which can be magnetized but do not tend to stay magnetized, and magnetically hard materials, which do tend to stay magnetized. The soft magnetic materials may comprise at least one of the ferrite, nickel-steel, cobalt-steel, metallic glass, powder sintered iron, silicon steel, etc.

A material with a high magnetic permeability, such as a ferromagnetic material, may be used to direct magnetic fields within the base member and the moveable member. Ferromagnetic materials may be composed of alloys of iron with cobalt, tungsten, nickel, aluminum, etc. The magnetic field intensity may be linearly proportional to the magnetic flux density, and may be related via the magnetic permeability.

Magnetic field lines tend to follow the path of least resistance through a conductive material. The moveable element can be made of magnetic material, for example in the form of a ferromagnetic plunger. A magnetic material may exhibit enhanced magnetization when placed in a magnetic field. When a magnetic material is positioned in a magnetic field, it can experience a mechanical force tending the material to move in a direction parallel to the field. The mechanical force at any point on the surface of the material is proportional to the square of the flux density of the magnetic field experienced at that point. Under influence of the magnetic closed flux paths going through the moveable member, a torque can be generated resulting in rotational movement of said moveable member. It is appreciated that the moveable member may be arranged to transmit a resultant force or torque to some other object (e.g. mirror), directly or indirectly.

The actuating device may be implemented in a steerable mirror, however other applications are also possible. Furthermore, it also perceivable that a plurality of actuating devices are included in a steerable mirror.

The actuating device may further comprise stress relaxation means for at least partially alleviating thermal expansion and/or contraction. The actuating device may further comprise damping means for reducing vibrations or oscillations.

It is appreciated that the controller can include digital processing integrated circuits and/or a programmable computer.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises", "comprising", "includes" and/or "including" when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper", "above", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The electronic unit 1 may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location. Optional features of various device and system embodiments and methods may be included in some embodiments and methods and not in others.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. An actuating device arranged for positioning a moveable member, wherein the actuating device comprises:
   a magnetically conductive base member arranged opposite the moveable member with a gap provided therebetween, wherein the moveable member is pivotally arranged with respect to the base member, and wherein the moveable member and the base member are magnetically conductive, thereby providing one or more magnetic closed flux paths;

at least one first magnet configured for providing a first magnetic flux through the base member and the moveable member, thereby providing at least two first magnetic closed flux paths; and at least one second magnet configured for providing a second magnetic flux through the base member and the moveable member, thereby providing at least one second magnetic closed flux path, wherein the at least one second magnet is an electromagnet; and wherein the at least one second magnet is configured to receive a controllable second magnet actuation signal that controls the second magnetic flux to change, in one or more of the at least two first magnetic closed flux paths, a resulting magnetic flux provided by the first magnetic flux and the second magnetic flux to pivot the moveable member, wherein the moveable member is pivotally suspended opposite the base member by a flexural pivot member that provides two or more unconstrained degrees of freedom for the moveable member and one or more constrained degrees of freedom for the moveable member, wherein the two or more unconstrained degrees of freedom include at least two rotational degrees of freedom that allow rotational movement of the movable member in at least two orthogonal directions or components thereof, wherein the one or more constrained degrees of freedom include at least a translational degree of freedom in a longitudinal direction of the flexural pivot member, wherein the flexural pivot member is a bending member, and wherein the flexural pivot member is arranged to suspend a central portion of the moveable member.

2. The actuating device according to claim 1, wherein the flexural pivot member is arranged in a vertical direction extending between the base member and the moveable member, wherein the flexural pivot member provides an increased stiffness in the vertical direction so as to constrain vertical movement of the moveable member with respect to the base member, and a decreased bending stiffness in at least one tip/tilt direction allowing rotational movement of the moveable member with respect to the base member.

3. The actuating device according to claim 1, wherein the flexural pivot member provides a rotational stiffness to the moveable member and biases the moveable member towards a biasing position.

4. The actuating device according to claim 1, further comprising a position sensor and a control unit, wherein the position sensor is configured to measure a position of the moveable member, wherein the control unit is configured to control the second magnet actuation signal to minimize a difference between an actual position of the moveable member detected by the position sensor and a desired position of the moveable member.

5. The actuating device according to claim 1, wherein at least one of:
the at least one first magnet is a permanent magnet; or
the at least one first magnet is an electromagnet configured for providing the first magnetic flux to be substantially constant in use, wherein the first magnet is further configured to receive a controllable first magnet actuation signal for setting the first magnetic flux.

6. The actuating device according to claim 1, wherein the at least one first magnet is configured to provide a first magnetic flux in the at least two first magnetic closed flux paths to position the moveable member in a balanced position, wherein the second magnet is configured to provide the second magnetic flux in the at least one second magnetic closed flux path to modify the resulting magnetic flux in the one or more of the at least two first magnetic closed flux paths to change the balanced position for changing an orientation of the moveable member.

7. The actuating device according to claim 1, wherein the at least one first magnet is arranged centrally on the base member or moveable member, wherein the at least one second magnet includes at least one pair of second magnets arranged on the base member or moveable member, and wherein the at least one first magnet is positioned between magnets of the at least one pair of second magnets.

8. The actuating device according to claim 1, wherein the at least one second magnet includes at least one magnet extending along a first direction and at least one magnet extending along a second direction, wherein the first direction differs from the second direction.

9. The actuating device according to claim 8, wherein the at least one second magnet includes at least a first pair of second magnets extending along a first direction and a second pair of second magnets extending along a second direction, wherein the at least one first magnet is positioned between the magnets of the first and second pairs of second magnets, and wherein the first direction differs from the second direction.

10. The actuating device according to claim 8, wherein the at least one second magnet includes three magnets, wherein each of the three magnets extends along a different direction.

11. The actuating device according to claim 1, wherein the at least one second magnet is arranged centrally on the base member or moveable member, wherein the at least one first magnet includes at least one pair of first magnets arranged on the base member or moveable member, and wherein the at least one second magnet is positioned between magnets of the at least one pair of first magnets.

12. The actuating device according to claim 1, wherein at least one second magnet comprises a pole shoe on which the at least one first magnet is positioned.

13. A steerable mirror unit comprising an actuating device arranged for positioning a moveable member, wherein the actuating device comprises:

a magnetically conductive base member arranged opposite the moveable member with a gap provided therebetween, wherein the moveable member is pivotally arranged with respect to the base member, and wherein the moveable member and the base member are magnetically conductive, thereby providing one or more magnetic closed flux paths;

at least one first magnet configured for providing a first magnetic flux through the base member and the moveable member, thereby providing at least two first magnetic closed flux paths; and at least one second magnet configured for providing a second magnetic flux through the base member and the moveable member, thereby providing at least one second magnetic closed flux path, wherein the at least one second magnet is an electromagnet; and wherein the at least one second magnet is configured to receive a controllable second magnet actuation signal that controls the second magnetic flux to change, in one or more of the at least two first magnetic closed flux paths, a resulting magnetic flux provided by the first magnetic flux and the second magnetic flux to pivot the moveable member, wherein the moveable member is pivotally suspended opposite the base member by a flexural pivot member that provides two or more unconstrained degrees of freedom for the moveable member and one or more constrained degrees of freedom for the moveable member, wherein the two or more unconstrained degrees of freedom include at least two rotational degrees of freedom that allow rotational movement of the movable member in at least two orthogonal directions of components thereof, wherein the one or more constrained degrees of freedom include at least a translational degree of freedom in a longitudinal direction of the flexural pivot member, and wherein the flexural pivot member is a bending member, wherein the flexural pivot member is arranged to suspend a central portion of the moveable member, and wherein the steerable mirror unit comprises a mirror attached to the moveable member.

14. A method for positioning a moveable member, comprising:

providing a magnetically conductive base member arranged opposite the moveable member with a gap provided therebetween, wherein the moveable member is pivotally arranged with respect to the base member, and wherein the moveable member and the base member are magnetically conductive, thereby providing one or more magnetic closed flux paths;

providing at least one first magnet configured for providing a first magnetic flux through the base member and the moveable member, thereby providing at least two first magnetic closed flux paths; and providing at least one second magnet configured for providing a second magnetic flux through the base member and the moveable member, thereby providing at least one second magnetic closed flux path, wherein the at least one second magnet is an electromagnet; and wherein the at least one second magnet is configured to receive a controllable second magnet actuation signal that controls the second magnetic flux to change, in one or more of the at least two first magnetic closed flux paths, a resulting magnetic flux provided by the first magnetic flux and the second magnetic flux to pivot the moveable member, wherein the moveable member is pivotally suspended opposite the base member by a flexural pivot member that provides two or more unconstrained degrees of freedom for the moveable member and one or more constrained degrees of freedom for the moveable member, wherein the two or more unconstrained degrees of freedom include at least two rotational degrees of freedom that allow rotational movement of the movable member in at least two orthogonal directions of components thereof, wherein the one or more constrained degrees of freedom include at least a translational degree of freedom in a longitudinal direction of the flexural pivot member, and wherein the flexural pivot member is a bending member, and wherein the flexural pivot member is arranged to suspend a central portion of the moveable member.

15. The actuating device according to claim 10, wherein the three second magnets are spaced at an interval of 120 degrees relative to each other.

* * * * *